US012720593B2

(12) United States Patent
Li et al.

(10) Patent No.: US 12,720,593 B2
(45) Date of Patent: Aug. 25, 2026

(54) METHOD OF SENSING BASED INTERFERENCE MANAGEMENT FOR NETWORK NODES

(71) Applicant: ZTE CORPORATION, Shenzhen (CN)

(72) Inventors: Ziyang Li, Shenzhen (CN); Nan Zhang, Shenzhen (CN); Wei Cao, Shenzhen (CN); Hanqing Xu, Shenzhen (CN); Linxi Hu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 274 days.

(21) Appl. No.: 18/592,670

(22) Filed: Mar. 1, 2024

(65) Prior Publication Data

US 2024/0284504 A1 Aug. 22, 2024

Related U.S. Application Data

(63) Continuation of application No. PCT/CN2022/073591, filed on Jan. 24, 2022.

(51) Int. Cl.
*H04W 74/0808* (2024.01)

(52) U.S. Cl.
CPC ................................ *H04W 74/0808* (2013.01)

(58) Field of Classification Search
CPC . H04W 74/0808; H04W 4/12; H04W 72/541; H04W 4/40; H04W 72/21; G01S 7/003; G01S 7/006; G01S 7/0232; G01S 7/0235; G01S 7/0236; G01S 2013/9316
See application file for complete search history.

(56) References Cited

U.S. PATENT DOCUMENTS

| | | | | |
|---|---|---|---|---|
| 2013/0115999 | A1 | 5/2013 | Sirotkin et al. | |
| 2014/0128115 | A1 | 5/2014 | Siomina et al. | |
| 2019/0165846 | A1 | 5/2019 | Kim et al. | |
| 2021/0227490 | A1 | 7/2021 | Yiu | |
| 2023/0284251 | A1* | 9/2023 | He | G01S 7/0232 370/329 |
| 2023/0370820 | A1* | 11/2023 | Cheng | H04W 4/38 |
| 2024/0022927 | A1* | 1/2024 | Tong | H04W 4/40 |

FOREIGN PATENT DOCUMENTS

| | | | |
|---|---|---|---|
| CN | 103765793 | A | 4/2014 |
| CN | 104885511 | A | 9/2015 |
| RU | 2575115 | C2 | 2/2016 |
| RU | 2601551 | C1 | 11/2016 |

(Continued)

OTHER PUBLICATIONS

Extended European Search Report for EP Appl. No. 22921203.0, dated Oct. 17, 2024 (9 pages).

(Continued)

*Primary Examiner* — Rushil P. Sampat
(74) *Attorney, Agent, or Firm* — Foley & Lardner LLP

(57) ABSTRACT

Method, device and computer program product for wireless communication are provided. A method includes: performing, by a network node, a sensing operation to acquire a sensing result of the sensing operation; and transmitting, by the network node to a wireless communication node, the sensing result or information of one or more actions corresponding to the sensing result.

19 Claims, 5 Drawing Sheets performing, by a network node, a sensing operation corresponding to at least one of a cell or a beam to acquire a sensing result of the sensing operation;

↓ transmitting, by the network node to a wireless communication node, the sensing result or information of one or more actions corresponding to the sensing result.

(56) References Cited

FOREIGN PATENT DOCUMENTS

| | | | |
|---|---|---|---|
| WO | WO-2020/163392 | A1 | 8/2020 |
| WO | WO-2021/178941 | A1 | 9/2021 |
| WO | WO-2021/248298 | A1 | 12/2021 |
| WO | WO_2022100499 | A1 * | 5/2022 |
| WO | WO_2022109772 | A1 * | 6/2022 |

OTHER PUBLICATIONS

Office Action for RU Appl. No. 2024106692, dated May 15, 2025 (with English translation, 13 pages).
Decision to Grant for RU Appl. No. 2024106692, dated Sep. 12, 2025 (with English translation, 17 pages).
International Search Report and Written Opinion for PCT Appl. No. PCT/CN2022/073591 mailed Sep. 15, 2022 (8 pages).

* cited by examiner performing, by a network node, a sensing operation corresponding to at least one of a cell or a beam to acquire a sensing result of the sensing operation;

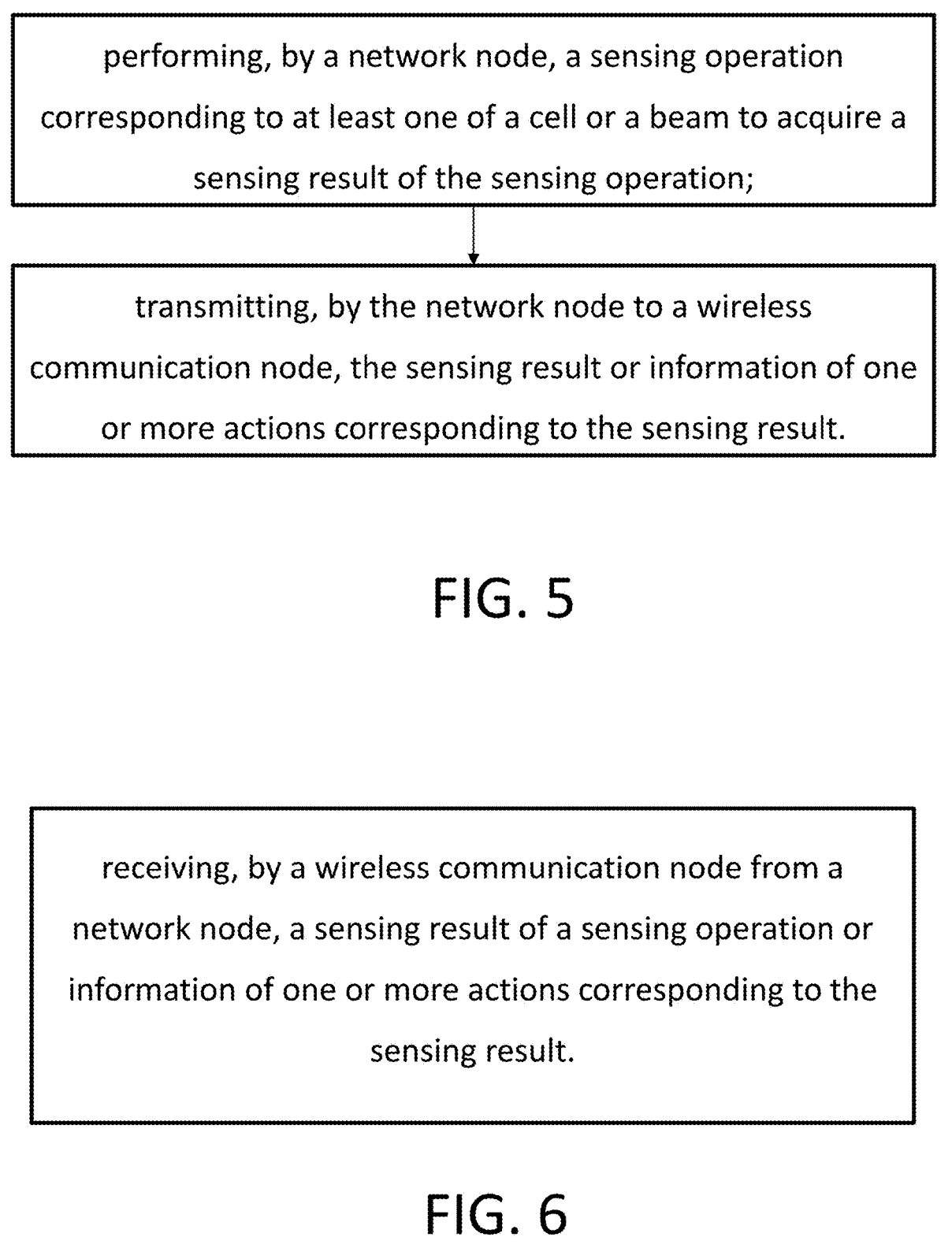

transmitting, by the network node to a wireless communication node, the sensing result or information of one or more actions corresponding to the sensing result.

FIG. 5 receiving, by a wireless communication node from a network node, a sensing result of a sensing operation or information of one or more actions corresponding to the sensing result.

FIG. 6

METHOD OF SENSING BASED INTERFERENCE MANAGEMENT FOR NETWORK NODES

CROSS-REFERENCE TO RELATED PATENT APPLICATIONS

This application is a Continuation of PCT Application No. PCT/CN2022/073591, filed Jan. 24, 2022, incorporated herein by reference in its entirety.

TECHNICAL FIELD

This document is directed generally to wireless communications, and in particular to 5th generation (5G) communications.

BACKGROUND

Coverage is a fundamental aspect of cellular network deployments. Mobile operators rely on different types of network nodes to offer blanket coverage in their deployments.

SUMMARY

As a result, new types of network nodes have been considered to increase mobile operators' flexibility for their network deployments. For example, Integrated Access and Backhaul (IAB) was introduced in Rel-16 and enhanced in Rel-17 as a new type of network node not requiring a wired backhaul. Another type of network node is the RF repeater which simply amplify-and-forward any signal that they receive. RF repeaters have seen a wide range of deployments in 2G, 3G and 4G to supplement the coverage provided by regular full-stack cells.

In Rel-18, a network-controlled repeater is introduced as an enhancement over conventional RF repeaters with the capability to receive and process side control information from the network. Side control information could allow a network-controlled repeater to perform its amplify-and-forward operation in a more efficient manner. Potential benefits could include mitigation of unnecessary noise amplification, transmissions and receptions with better spatial directivity, and simplified network integration.

Network-controlled repeater can be regarded as a steppingstone for re-configurable intelligent surface (RIS), a RIS node can adjust the phase and amplitude of received signal to improve the coverage.

In this disclosure, such kind of network node, including and not limited to network-controlled repeater, smart repeater, Re-configuration intelligent surface (RIS), Integrated Access and Backhaul (IAB), are denoted as a smart node (SN) for simplicity. SN is a kind of network node to assist a base station (BS) to improve coverage and given that SNs are not aware of other SNs, a user equipment (UE) may suffer from interference from other SNs, especially for cell edge UEs.

This document relates to methods of status information indication for network nodes, devices thereof and systems thereof. In particular, for mitigating unexpected interference, in this disclosure, sensing based measurement is provided to be used by SN to measure the interference, and based on the sensing results, SN or BS may perform some actions to mitigate the interference for network or specific UE, such as power control, on/off status of amplify-and-forward operation, beam measurement and so on.

One aspect of the present disclosure relates to a wireless communication method. In an embodiment, the wireless communication method includes: creating, by an orchestrator node, virtual link, VL, information according to virtual link descriptors, VLDs, and information of created cluster networks, wherein the VL information comprises the information of the created cluster networks mapping to relevant VLs, and an association between connection points, CPs, and the created cluster networks; and transmitting, by the orchestrator node to a virtualized network function manager node, a Containerized Virtualized Network Function, CNF, instantiating request comprising the VL information for instantiating CNFs for a Network Service, NS.

Another aspect of the present disclosure relates to a wireless communication method. In an embodiment, the wireless communication method includes: receiving, by a wireless communication node from a network node, a sensing result of a sensing operation or information of one or more actions corresponding to the sensing result.

Another aspect of the present disclosure relates to a wireless communication node. In an embodiment, the wireless communication node includes a communication unit and a processor. The processor is configured to: perform a sensing operation to acquire a sensing result of the sensing operation; and control the communication unit to transmit, to a wireless communication node, the sensing result or information of one or more actions corresponding to the sensing result.

Another aspect of the present disclosure relates to a wireless communication node. In an embodiment, the wireless communication node includes a communication unit and a processor. The processor is configured to: receive, via the communication unit from a network node, a sensing result of a sensing operation or information of one or more actions corresponding to the sensing result.

Various embodiments may preferably implement the following features:

Preferably or in some embodiments, the sensing operation is performed according to at least one of: periodicity information, a time domain offset, a frequency domain offset, Start and Length Indicator Values, SLIV, time domain resources, frequency domain resources, or a Time Division Duplex, TDD, uplink and downlink pattern.

Preferably or in some embodiments, the sensing operation is performed periodically, based on events, or based on a TDD uplink and downlink pattern.

Preferably or in some embodiments, the sensing operation is performed to sense a reference signal to obtain a cell identification and an interference level according to the reference signal.

Preferably or in some embodiments, the sensing operation is performed to sense at least one of: a Synchronization Signal/PBCH block, SSB, a Channel Status Information Reference Signal, CSI-RS, or a Sounding Reference Signal, SRS.

Preferably or in some embodiments, the sensing operation is an energy-based sensing operation.

Preferably or in some embodiments, the energy-based sensing is directional or omni-directional.

Preferably or in some embodiments, the sensing result comprises at least one of: a cell identification, an interference level, a Reference Signal Received Power, RSRP, an energy level, or a beam index.

Preferably or in some embodiments, the method further comprises: comparing, by the network node, the sensing result with one or more thresholds; and performing, by the network node, one or more actions according to the comparison result.

Preferably or in some embodiments, the method further comprises: receiving, by the network node from the wireless communication node, one or more requested actions corresponding to the sensing result; and performing, by the network node, the one or more requested actions.

Preferably or in some embodiments, the one or more actions or the one or more requested actions comprises changing at least one of: an on/off forwarding status, a power control parameter, a phase, an amplitude, an operation mode, a Transmission Configuration Indicator, TCI, state, or a beam index.

Preferably or in some embodiments, the sensing result or the information of one or more actions are transmitted via Uplink Control Information, UCI, in a Physical Uplink Control Channel, PUCCH, or a Physical Uplink Shared Channel, PUSCH.

Preferably or in some embodiments, wherein the sensing result or the information of one or more actions are transmitted via a Medium Access Control Control Element, MAC CE in a PUSCH.

Preferably or in some embodiments, the method further comprises: transmitting, by wireless communication node to the network node, one or more thresholds to allow the network node to compare the sensing result with the one or more thresholds and perform one or more actions according to the comparison result.

Preferably or in some embodiments, the method further comprises: transmitting, by wireless communication node to the network node, one or more requested actions corresponding to the sensing result to request the network node to perform the one or more requested actions.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

FIGS. 5 and 6 show flowcharts of methods according to embodiments of the present disclosure.

DETAILED DESCRIPTION

Figure 1:
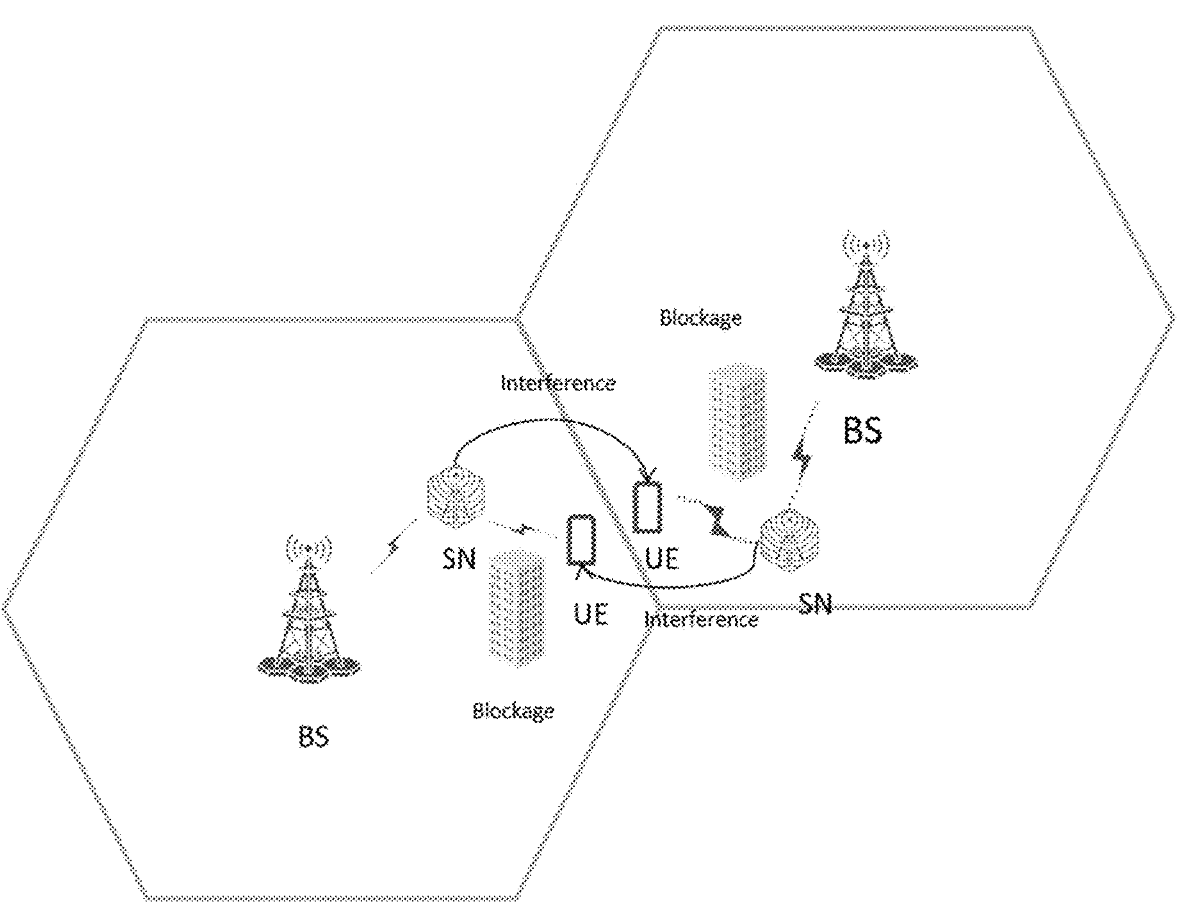
FIG. 1 shows a schematic diagram of a network according to an embodiment of the present disclosure.

FIG. 1 shows a schematic diagram of a network (architecture) according to an embodiment of the present disclosure. As illustrated in FIG. 1, the BSs can serve the UEs respectively in their cells via the SNs when there are blockages between the BSs and the UEs. However, in some cases, the signals from an SN may interfere the communications in an adjacent cell.

Figure 2A:
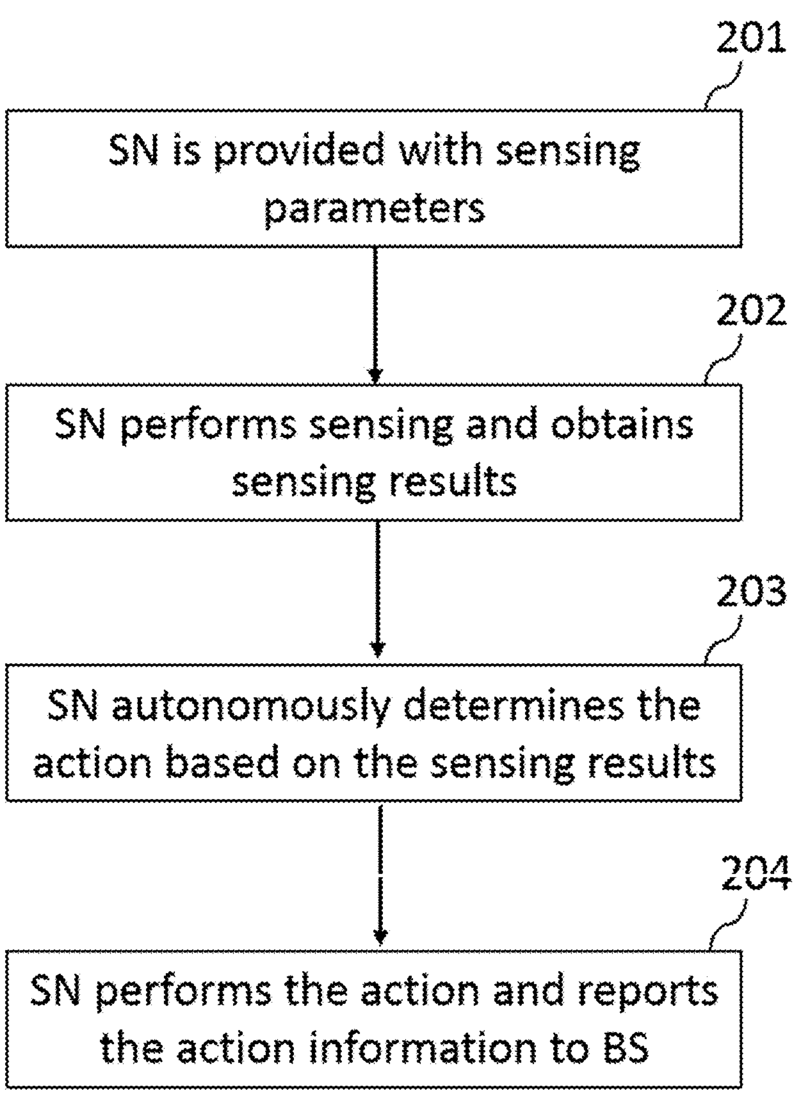
FIG. 2A shows a schematic diagram of a procedure according to an embodiment of the present disclosure.

FIG. 2A shows a schematic diagram of a procedure according to an embodiment of the present disclosure. In this embodiment, the SN is configured to perform sensing to autonomously determine the action(s) to be performed, and the SN reports the action information to the BS.

Specifically, the procedure shown in FIG. 2A comprises:

Step 201: The SN is provided with a first set of parameters to perform sensing operation, and is also provided with a second set of parameters for decision criteria. In an embodiment, the first set of parameters and/or the second set of parameters are provided by the BS.

In an embodiment, the first set of parameters includes at least one of periodicity information, a time domain offset, a frequency domain offset, SLIVs (Start and Length Indicator Values), time domain resources, frequency domain resources, a TDD UL/DL pattern.

In an embodiment, the second set of parameters includes at least a threshold.

In an embodiment, the above parameters can be configured by system information, Radio resource control (RRC), Downlink control information (DCI) or Operation Administration and Maintenance (OAM).

Step 202: The SN performs a sensing operation and obtains the sensing result(s).

In various embodiments, the sensing operation can be 1) periodically performed or 2) event triggered or 3) based on TDD UL/DL pattern, e.g., sensing at each time switching form UL to DL or from DL to UL switching time.

In an embodiment, the sensing operation can be RS (reference signal) based sensing, in which the RS can be an SSB (Synchronization Signal/PBCH block), a CSI-RS (Channel Status Information Reference Signal) or an SRS (Sounding Reference Signal). For example, the SN may detect and decode the corresponding RS signal to obtain the cell id (identification), and/or perform the RSSI (Received Signal Strength Indicator) measurement to obtain the corresponding interference level.

In an embodiment, the sensing operation can be energy-based sensing, which can be directional sensing or omni-directional sensing. In this case, the SN does not need to decode the received signal. The output may be an energy level, which can be compared with a pre-defined threshold, e.g., similar as an LBT (Listen before talk) operation in an unlicensed band.

Step 203: According to the sensing result(s), the SN autonomously determines the action(s) to be performed.

In various embodiments, the sensing result(s) can be at least one of 1) cell id (e.g., a cell id with high interference), 2) interference level, 3) RSRP, 4) energy level, or 5) beam index.

In an embodiment, decision criterias may be used for determining the action(s) to be performed, e.g., if the sensing result (e.g., an interference level) is above the threshold, the SN is off, otherwise, the SN is on.

In an embodiment, the action(s) includes changing at least one of on/off forwarding status, power control parameter, phase, amplitude, operation mode (e.g., reflection mode, absorption mode, scattered mode . . . ), TCI state, or beam index.

Step 204: The SN performs the action(s) and reports the action information (information of the action(s)) to the BS.

In an embodiment, the action information can be included in a UCI (Uplink Control Information) and transmitted to the BS through PUCCH or PUSCH.

In an embodiment, the action information can be included in a new MAC CE contained in payload and transmitted to the BS though PUSCH, the new MAC CE, namely e.g. SN state MAC CE, needs to be defined including at least one of the following components: on/off forwarding status, power control parameter, phase, amplitude, operation mode (e.g. reflection mode, absorption mode, scattered mode . . . ), TCI state, or beam index.

Figure 2B:
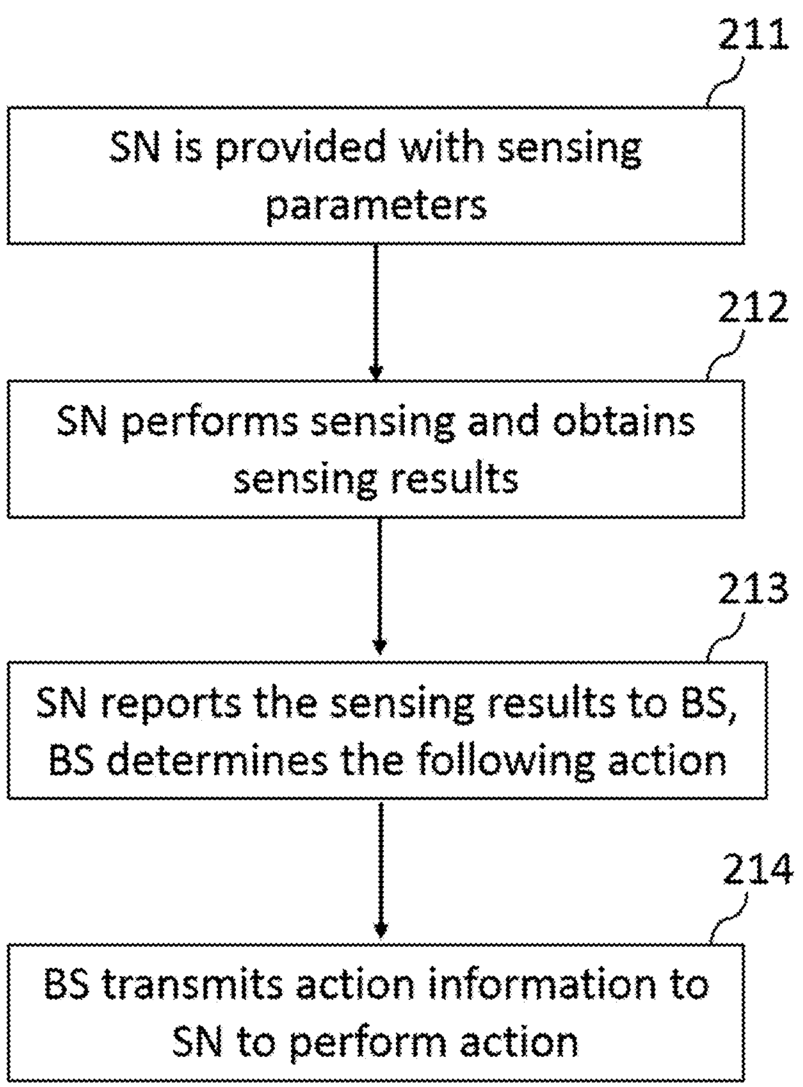
FIG. 2B shows a schematic diagram of a procedure according to an embodiment of the present disclosure.

FIG. 2B shows a schematic diagram of a procedure according to an embodiment of the present disclosure. In this embodiment, the SN is configured to perform sensing and the SN reports sensing result(s) to the BS to determine the action(s) to be performed by the SN. Subsequently, the BS transmits the action information to the SN to perform the action.

Specifically, the procedure shown in FIG. 2B comprises:

Step 211: The SN is provided with a first set of parameters to perform a sensing operation.

In various embodiments, the first set of parameters includes at least one of: periodicity information, time domain offset, frequency domain offset, SLIV, time domain resource, frequency domain resource, or TDD UL/DL pattern. In an embodiment, the first set of parameters is provided by the BS.

In various embodiments, the above parameters can be configured by system information, RRC, DCI or OAM.

Step 212: The SN performs a sensing operation and obtains sensing result(s).

In various embodiments, the sensing operation any one of: 1) periodically performed, 2) event triggered, or 3) based on TDD UL/DL pattern, e.g., sensing at each UL to DL switching time.

In an embodiment, the sensing operation can be RS based sensing, wherein RS can be SSB, CSI-RS or SRS. For example, the SN may detect and decode the corresponding RS signal to obtain the cell id, and/or perform the RSSI measurement to obtain the corresponding interference level.

In an embodiment, the sensing operation can be energy based sensing, which can be directional sensing or omni-directional sensing. The SN does not need to decode the received signal. The output would be an energy level, which can be compared with a pre-defined threshold, e.g., similar as LBT operation in unlicensed band.

Step 213: The SN reports the sensing result(s) to the BS and the BS determines the action(s) to be performed by the SN.

In various embodiments, the sensing result(s) can be at least one of: 1) (high interference) cell id, 2) interference level, 3) RSRP, 4) energy level, or 5) beam index.

In an embodiment, the action(s) includes changing at least one of: on/off forwarding status, power control parameter, phase, amplitude, operation mode (e.g., reflection mode, absorption mode, scattered mode . . . ), TCI state, or beam index.

In an embodiment, the sensing result(s) can be included in UCI and transmitted to the BS through PUCCH or PUSCH.

In an embodiment, the sensing result(s) can be included in a new MAC CE contained in payload and transmitted to BS though PUSCH, the new MAC CE needs to be defined including at least one of: 1) (high interference) cell id, 2) interference level, 3) RSRP, 4) energy level, or 5) beam index.

In an embodiment, the reporting method disclosed in the two preceding paragraphs can be jointly defined with the one introduced in step 204.

Step 214: The BS transmits action information to the SN to perform the action(s).

Details of Steps 211 to 214 are similar to those in Steps 201 to 204, and will not be repeated herein.

Figure 3:
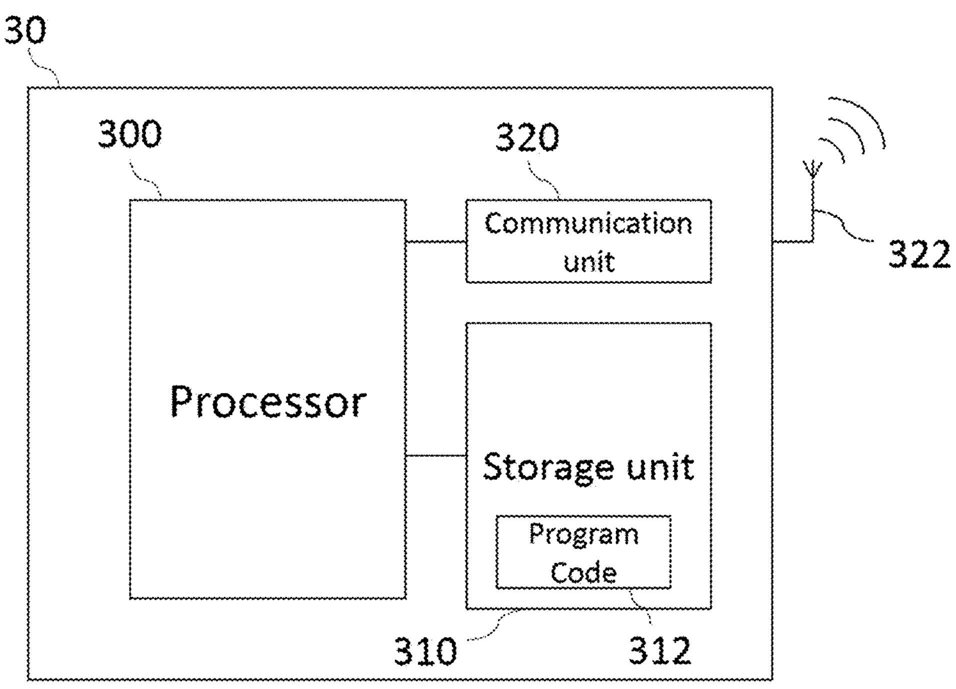
FIG. 3 shows an example of a schematic diagram of a wireless terminal according to an embodiment of the present disclosure.

FIG. 3 relates to a schematic diagram of a wireless terminal 30 according to an embodiment of the present disclosure. The wireless terminal 30 may be a user equipment (UE), a mobile phone, a laptop, a tablet computer, an electronic book or a portable computer system and is not limited herein. The wireless terminal 30 may include a processor 300 such as a microprocessor or Application Specific Integrated Circuit (ASIC), a storage unit 310 and a communication unit 320. The storage unit 310 may be any data storage device that stores a program code 312, which is accessed and executed by the processor 300. Embodiments of the storage unit 312 include but are not limited to a subscriber identity module (SIM), read-only memory (ROM), flash memory, random-access memory (RAM), hard-disk, and optical data storage device. The communication unit 320 may a transceiver and is used to transmit and receive signals (e.g., messages or packets) according to processing results of the processor 300. In an embodiment, the communication unit 320 transmits and receives the signals via at least one antenna 322 shown in FIG. 3.

In an embodiment, the storage unit 310 and the program code 312 may be omitted and the processor 300 may include a storage unit with stored program code.

The processor 300 may implement any one of the steps in exemplified embodiments on the wireless terminal 30, e.g., by executing the program code 312.

The communication unit 320 may be a transceiver. The communication unit 320 may as an alternative or in addition be combining a transmitting unit and a receiving unit configured to transmit and to receive, respectively, signals to and from a wireless network node (e.g., a base station).

Figure 4:
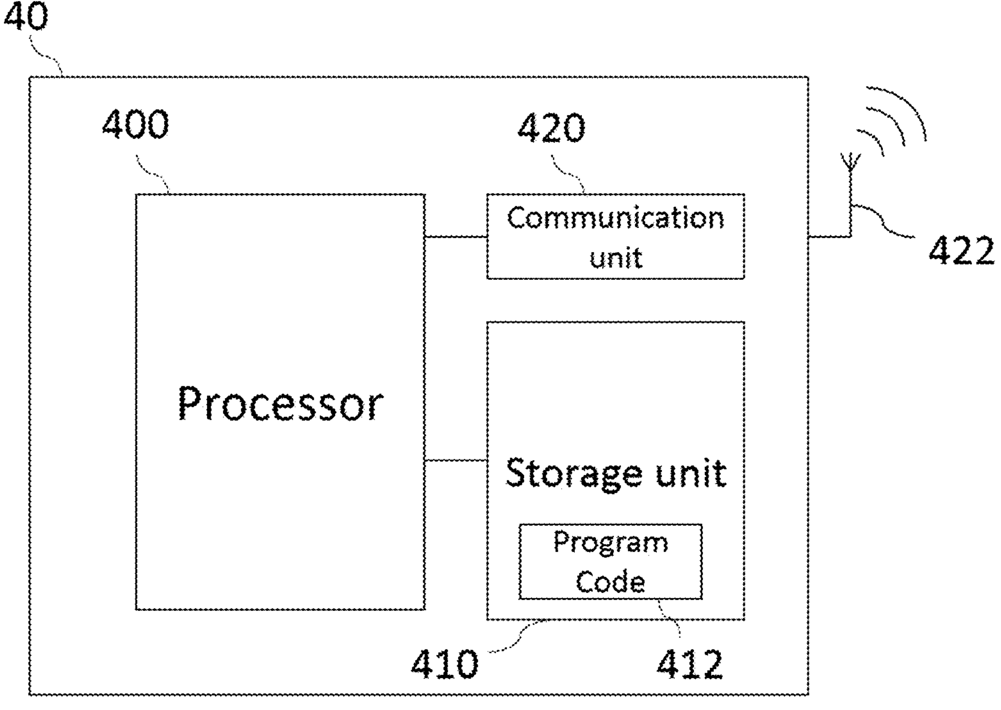
FIG. 4 shows an example of a schematic diagram of a wireless network node according to an embodiment of the present disclosure.

FIG. 4 relates to a schematic diagram of a wireless network node 40 according to an embodiment of the present disclosure. The wireless network node 40 may be a satellite, a base station (BS), a network node (e.g., a smart node), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 40 may comprise (perform) at least one network function such as an access and mobility management function (AMF), a session management function (SMF), a user place function (UPF), a policy control function (PCF), an application function (AF), etc. The wireless network node 40 may include a processor 400 such as a microprocessor or ASIC, a storage unit 410 and a communication unit 420. The storage unit 410 may be any data storage device that stores a program code 412, which is accessed and executed by the processor 400. Examples of the storage unit 412 include but are not limited to a SIM, ROM, flash memory, RAM, hard-disk, and optical data storage device. The communication unit 420 may be a transceiver and is used to transmit and receive signals (e.g., messages or packets) according to processing results of the processor 400. In an example, the communication unit 420 transmits and receives the signals via at least one antenna 422 shown in FIG. 4.

In an embodiment, the storage unit 410 and the program code 412 may be omitted. The processor 400 may include a storage unit with stored program code.

The processor 400 may implement any steps described in exemplified embodiments on the wireless network node 40, e.g., via executing the program code 412.

The communication unit 420 may be a transceiver. The communication unit 420 may as an alternative or in addition be combining a transmitting unit and a receiving unit configured to transmit and to receive, respectively, signals to and from a wireless terminal (e.g., a user equipment or another wireless network node).

FIG. 5 shows a flowchart of a method according to an embodiment of the present disclosure. The method shown in FIG. 5 may be used in a smart node (e.g., wireless network node/wireless device comprising the smart node or wireless network node/wireless device performing at least part of functionalities of the smart node).

In an embodiment, the method comprises: performing, by a network node (e.g., the smart node), a sensing operation to acquire a sensing result of the sensing operation; and transmitting, by the network node to a wireless communication node (e.g., the BS), the sensing result or information of one or more actions corresponding to the sensing result.

In an embodiment, the sensing operation is performed according to at least one of: periodicity information, a time domain offset, a frequency domain offset, Start and Length Indicator Values, SLIV, time domain resources, frequency domain resources, or a Time Division Duplex, TDD, uplink and downlink pattern.

In an embodiment, the sensing result comprises at least one of: a cell identification, an interference level, a Reference Signal Received Power, RSRP, an energy level, or a beam index.

Details of the method can be ascertained by referring to the embodiments above.

FIG. 6 shows a flowchart of a method according to an embodiment of the present disclosure. The method shown in FIG. 6 may be used in a BS (e.g., wireless network node/wireless device comprising the BS or wireless network node/wireless device performing at least part of functionalities of the BS).

In an embodiment, the method comprises: receiving, by a wireless communication node (e.g., BS) from a network node (e.g., SN), a sensing result of a sensing operation or information of one or more actions corresponding to the sensing result.

Details of the method can be ascertained by referring to the embodiments above.

In summary, in an embodiment, the SN performs sensing based measurement, including RS based sensing and energy based sensing, wherein the sensing time may be 1) periodically performed or 2) event triggered or 3) based on TDD UL/DL pattern.

In an embodiment, the sensing result(s) may be at least one of: 1) (high interference) cell id, 2) interference level, 3) RSRP, 4) energy level, or 5) beam index.

In an embodiment, the SN may autonomously determine or report to the BS to change at least one of the following parameters: on/off forwarding status, power control parameter, phase, amplitude, operation mode (e.g., reflection mode, absorption mode, scattered mode . . . ), TCI state, or beam index.

In an embodiment, the SN may report sensing result(s) or action information to the BS, which may include two ways: 1) in UCI through PUCCH or PUSCH and 2) in MAC CE within a payload through PUSCH, in this way a new MAC CE needs to be defined including at least one of the parameters listed above.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of the claims. Thus, the disclosure is not intended to be limited to the implementations shown herein, but is to be accorded the widest scope consistent with the novel features and principles disclosed herein, as recited in the claims below.

The invention claimed is:

1. A wireless communication method comprising:

performing, by a network node, a sensing operation to acquire a sensing result of the sensing operation;

comparing, by the network node, the sensing result with one or more thresholds to determine a comparison result;

performing, by the network node, one or more actions according to the comparison result; and transmitting, by the network node to a wireless communication node, the sensing result or information of one or more actions corresponding to the sensing result.

2. The wireless communication method of claim 1, wherein the sensing operation is performed according to at least one of: periodicity information, a time domain offset, a frequency domain offset, Start and Length Indicator Values (SLIV) time domain resources, frequency domain resources, or a Time Division Duplex (TDD) uplink and downlink pattern.

3. The wireless communication method of claim 1, wherein the sensing operation is performed periodically, based on events, or based on a TDD uplink and downlink pattern.

4. The wireless communication method of claim 1, wherein the sensing operation is performed to sense a reference signal to obtain a cell identification and an interference level according to the reference signal.

5. The wireless communication method of claim 1, wherein the sensing operation is performed to sense at least one of: a Synchronization Signal/PBCH block (SSB), a Channel Status Information Reference Signal (CSI-RS) or a Sounding Reference Signal (SRS).

6. The wireless communication method of claim 1, wherein the sensing operation is an energy-based sensing operation.

7. The wireless communication method of claim 6, wherein the energy-based sensing operation is directional or omni-directional.

8. The wireless communication method of claim 1, wherein the sensing result comprises at least one of: a cell identification, an interference level, a Reference Signal Received Power (RSRP) an energy level, or a beam index.

9. The wireless communication method of claim 1, further comprising:

receiving, by the network node from the wireless communication node, one or more requested actions corresponding to the sensing result; and performing, by the network node, the one or more requested actions.

10. The wireless communication method of claim 9, wherein the one or more actions or the one or more requested actions comprises changing at least one of: an on/off forwarding status, a power control parameter, a phase, an amplitude, an operation mode, a Transmission Configuration Indicator (TCI) state, or a beam index.

11. The wireless communication method of claim 1, wherein the sensing result or the information of one or more actions are transmitted via Uplink Control Information (UCI) in a Physical Uplink Control Channel (PUCCH) or a Physical Uplink Shared Channel (PUSCH).

12. The wireless communication method of claim 1, wherein the sensing result or the information of one or more actions are transmitted via a Medium Access Control Control Element (MAC CE) in a PUSCH.

13. A wireless communication method comprising:

receiving, by a wireless communication node from a network node, a sensing result of a sensing operation or information of one or more actions corresponding to the sensing result, wherein the sensing result is compared with one or more thresholds to determine a comparison result, for the network node to perform one or more actions according to the comparison result.

14. A network node, comprising:

a communication unit; and a processor configured to:

perform a sensing operation to acquire a sensing result of the sensing operation;

compare the sensing result with one or more thresholds to determine a comparison result;

perform one or more actions according to the comparison result according to the comparison result; and control the communication unit to transmit, to a wireless communication node, the sensing result or information of one or more actions corresponding to the sensing result.

15. The network node of claim 14, wherein the processor is configured to perform the sensing operation according to at least one of: periodicity information, a time domain offset, a frequency domain offset, Start and Length Indicator Values (SLIV) time domain resources, frequency domain resources, or a Time Division Duplex (TDD) uplink and downlink pattern.

16. The network node of claim 14, wherein the processor is configured to perform the sensing operation periodically, based on events, or based on a TDD uplink and downlink pattern.

17. The network node of claim 14, wherein the processor is configured to perform the sensing operation to sense a reference signal to obtain a cell identification and an interference level according to the reference signal.

18. The network node of claim 14, wherein the processor is configured to perform the sensing operation to sense at least one of: a Synchronization Signal/PBCH block (SSB), a Channel Status Information Reference Signal (CSI-RS) or a Sounding Reference Signal (SRS).

19. A non-transitory computer-readable medium comprising a program code stored thereupon, the program code, when executed by at least one processor, causing the at least one processor to implement a wireless communication method comprising:

performing, in a network node, a sensing operation to acquire a sensing result of the sensing operation;

comparing, in the network node, the sensing result with one or more thresholds to determine a comparison result;

performing, in the network node, one or more actions according to the comparison result; and transmitting, from the network node to a wireless communication node, the sensing result or information of one or more actions corresponding to the sensing result.

* * * * *